Oct. 24, 1961            R. H. WALLACE            3,005,961

SELF-CYCLING TRIANGULAR WAVEFORM GENERATOR

Filed Aug. 3, 1960

INVENTOR.
REUBEN H. WALLACE

BY

ATTORNEYS

United States Patent Office 3,005,961
Patented Oct. 24, 1961

3,005,961
SELF-CYCLING TRIANGULAR WAVEFORM
GENERATOR
Reuben H. Wallace, Austin, Tex., assignor, by mesne assignments, to the United States of America as represented by the Secretary of the Navy
Filed Aug. 3, 1960, Ser. No. 47,336
4 Claims. (Cl. 331—54)

This invention relates to a self-cycling triangular waveform generator and more particularly to a self-cycling triangular waveform generator utilizing a multiar comparator for determining the end of each cycle and a phantastron for determining the start of each cycle.

The prior art circuits of this type utilized a triangular wave generator in which the stability of period or end points was marked by the firing or extinguishing point of gas tubes. These circuits had the disadvantage that since gas tubes are inherently unstable in their operation, the period or end point of each cycle was also unstable resulting in a variable period or frequency which could not be tolerated in certain types of associated equipment.

It is thus an object of the present invention to provide a self-cycling triangular waveform generator in which the cycle period is held to a very close tolerance.

Another object is the provision of a self-cycling triangular waveform generator in which the frequency of operation is extremely stable.

A further object of the present invention is to provide a self-cycling triangular waveform generator in which the period, starting and stopping points are easily controlled and adjusted.

Yet another object of the present invention is to provide a self-cycling triangular waveform generator utilizing a minimum of precision components.

Still another object is the provision of a self-cycling triangular waveform generator with an extremely stable duty cycle.

According to the invention, a linearly decreasing voltage generator utilizing constant current techniques is coupled to the input of a multiar comparator. The multiar comparator has a predetermined reference voltage set so that upon the input voltage reaching the reference voltage the multiar will cycle. A pulse output is taken from the multiar which triggers a phantastron circuit. The phantastron is utilized as a square wave generator i.e. the output is taken at the screen. This output is then coupled back to recycle the linearly decreasing voltage generator means, which insures stability of start time and duty cycle. Three adjustments are provided to control the starting and stopping points and slope of the triangular output waveform as will be described in detail in the body of the specification. It is thus seen that the paramount inherent disadvantage of the prior art i.e. unstable end points, period and frequency is overcome by the present invention.

Other objects and many of the attendant advantages thereof will be more readily apparent with reference to the following detailed description taken in connection with the drawings in which.

Figure 1:
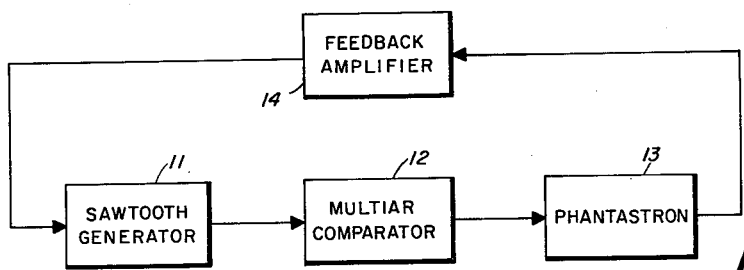
FIG. 1 is a system block diagram of a preferred embodiment of the present invention.

Referring to FIG. 1, there is shown a triangular waveform generator at 11 coupled to a multiar comparator at 12 which in turn is coupled to phantastron 13. Phantastron 13 is fed back through feedback amplifier 14 to sawtooth generator 11.

Figure 2:
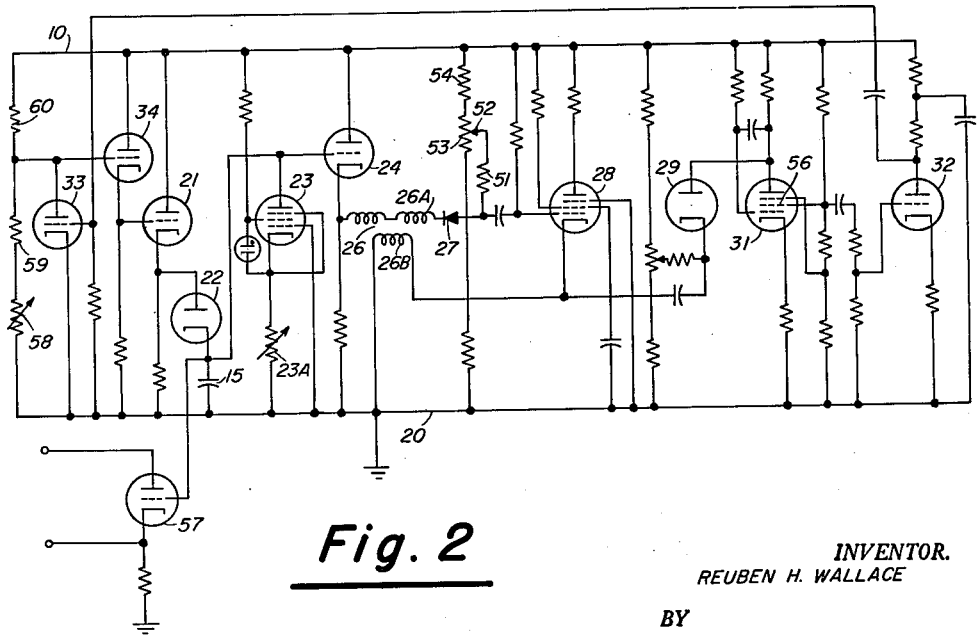
FIG. 2 is a schematic representation of the block diagram of FIG. 1.

Referring to FIG. 2 there is shown generally a sawtooth waveform generator at triode 21, diode 22 and constant current pentode 23 coupled through triode 24 to the multiar circuit. The multiar circuit is shown generally at transformer 26, diode 27 and pentode 28. The output of the multiar circuit is taken through diode 29 to phantastron 31. The output of phantastron 31 is coupled through feedback amplifiers 32, 33 and 34 to the input of triode 21.

Figure 3:
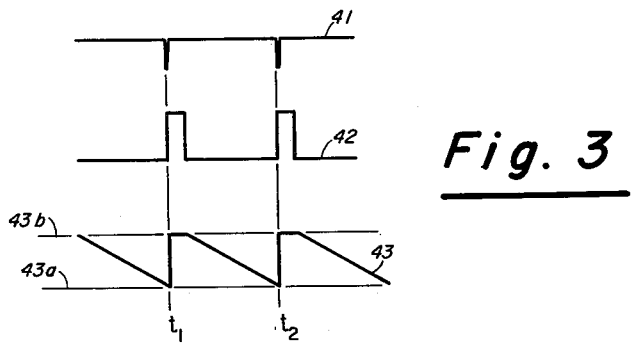
FIG. 3 shows the various waveforms present throughout the systems of FIGS. 1 and 2.

Referring to FIG. 3 there are shown three waveforms, 41, 42 and 43, which appear at various points in the circuits of FIGS. 1 and 2 to be described later.

Operation

Referring now back to FIGS. 1 and 3, the output of sawtooth generator 11 shown as waveform 43, in FIG. 3, is coupled to the multiar comparator 12. The multiar comparator has a reference voltage set which produces a negative pulse when the input equals the reference voltage. As shown in FIG. 3 this happens at $t_1$ and $t_2$ i.e. reference level 43a is the reference voltage at which the multiar comparator 12 is preset and when the input from triangular waveform generator 11 drops to this level, multiar comparator 12 cycles, producing a negative pulse shown at 41 at its output. This waveform is then coupled to phantastron 13 which produces a positive square wave shown at 42 at the output of phantastron 13. Waveform 42 is fed back through feedback amplifier 14 to recycle triangular waveform generator 11.

Referring now to FIG. 2 the operation of the system will be described in detail. Assuming a high positive voltage is applied to bus 10 as compared to ground, current will flow from ground to the bottom of sweep capacitor 15, and from the top of sweep capacitor 15 through diode 22 and triode 21 to positive bus 10. This will continue until the voltage at the top of capacitor 15 is roughly equal to the drop across the cathode resistor of triode 21. During this rise in voltage, however, current will flow from ground bus 20 through winding 26a of transformer 26, diode 27, resistor 51, sliding contact 52, resistance 53 and resistance 54 to positive bus 10. This will couple a signal to the control grid of multiar pentode 28 which will cause the multiar to cycle, due to the feedback through winding 26b of transformer 26. As is well known in the art, a negative pulse will appear at the cathode of pentode 28 which is coupled through diode 29 to phantastron 31, causing phantastron 31 to cycle. The cycling of phantastron 31 will cause a positive square wave to appear at its screen grid 56 which is coupled as a signal to triode 32 and sent back as a negative pulse to triode 33. Triode 33 will then couple a positive pulse to triode 34, which is a cathode follower, and triode 32 will also receive a positive pulse. This positive pulse will drive the cathode of triode 21 extremely positive due to its high cathode resistor and charge up capacitor 15 through diode 22 to the reference level shown as 43b in FIG. 3. At the end of the phantastron pulse, the cathode of triode 21 returns to its normal voltage which in the preferred embodiment is approximately 60 volts. This, of course, cuts off diode 22 and starts capacitor 15 discharging through constant current pentode 23. Constant current pentode 23 has an extremely high cathode resistance on the order of 100,000 ohms shown at 23a, which is variable to vary the amount of discharge current varying the slope of the triangular waveform. This waveform is shown at 43 in FIG. 3. When, at time $t_1$, the voltage at the cathode of triode 24 has dropped to the voltage set at contact 52, diode 27 will conduct. This causes the multiar to recycle and again couples a pulse to the phantastron pentode 31, and the system repeats itself. An output is taken at the top of capacitance 15 through a cathode follower shown at triode 57. A voltage divider consisting of variable resistance 58, resistor 59 and resistor 60, determine the reference voltage which is set at the plate of diode 22, which as will be understood from the above description, will determine the high input point of waveform 43. The setting of sliding contact 52, of course, determines when the multiar cycles and thus sets the low point of waveform 43. Cathode resistance 23a of constant current pentode 23 determines the amount of discharge current as previously mentioned which determines the slope. The detailed operation of the multiar and phantastron circuits is deemed unnecessary since they are conventional and well known in the triangular waveform art. A detailed description of these circuits is given in the Radiation Laboratory Series, 1949, volume 19, pages 343–348 and 197–200, respectively, McGraw-Hill Book Company.

It is thus seen that through the use of a multiar comparator and a phantastron, an extremely reliable self-cycling triangular waveform generator has been disclosed which will not vary in period, frequency, or starting and ending points.

Obviously many modifications and variations of the present invention are possible in the light of the above teachings. It is therefore to be understood that within the scope of the appended claims the invention may be practiced otherwise than as specifically described.

What is claimed is:

1. A self-cycling triangular waveform generator comprising a multiar comparator having an input and an output, linearly decreasing voltage generating means connected to said multiar input, a phantastron square-wave generator having an input and an output, said multiar output connected to said phantastron input, means for switching said linearly decreasing voltage generating means having an input and an output, said phantastron output connected to said switching means input, and the output of said switching means connected to said linearly decreasing voltage generating means for switching said generating means and determining the starting time and voltage thereof.

2. The self-cycling triangular waveform generator of claim 1 wherein said generating means comprises a charge capacitor in parallel relationship with constant current means and in serial relationship with said switching means.

3. The self-cycling triangular waveform generator of claim 2 wherein said switching means comprises a diode and an amplifying active element in serial relationship.

4. The self-cycling triangular waveform generator of claim 2 wherein said constant current means comprises a pentode vacuum tube with a high resistance cathode resistor, no plate load and the screen grid element thereof referenced to the cathode element.

No references cited.